United States Patent [19]

Lebecque

[11] Patent Number: 4,538,415

[45] Date of Patent: Sep. 3, 1985

[54] POTENTIAL ENERGY ACCUMULATING SYSTEM USING MULTIPLE TYPES OF ENERGY INPUT

[76] Inventor: Maurice Lebecque, 7849 Bloomfield St., Apt. 3, Montreal, Canada, H3N 2H4

[21] Appl. No.: 591,673

[22] Filed: Mar. 19, 1984

Related U.S. Application Data

[63] Continuation-in-part of Ser. No. 422,887, Sep. 24, 1982, abandoned.

[51] Int. Cl.³ .............................................. F03G 3/04
[52] U.S. Cl. ........................................ 60/639; 60/398; 285/33
[58] Field of Search ................ 60/398, 639, 698, 721; 290/1 D; 185/32, 33; 415/5, 6

[56] References Cited

U.S. PATENT DOCUMENTS

| | | | |
|---|---|---|---|
| 512,352 | 1/1894 | Zwiebel | 60/398 X |
| 2,340,155 | 1/1944 | Tanner | 185/33 X |
| 4,030,300 | 6/1977 | Thompson | 60/639 |
| 4,201,059 | 5/1980 | Feder | 60/639 |

*Primary Examiner*—Stephen F. Husar

[57] ABSTRACT

This potential energy accumulating system is of the type adapted to harness multiple sources of energy, including those of non-variable input such as from fuel and those of variable input, such as from the wind, the sun, the geothermal steam, animal power or the water. The system is characterized by being made to reduce the effect of the variable input of such sources of energy by stocking the same in the form of potential energy, releasable under kinetic form, and by being compatible to be coupled to and driven by any kind or number of machines operated by variable and non-variable energy sources. This system includes a closed circuit arrangement to use and accumulate the potential energy of relatively heavy balls or bodies of water, and to mechanically regulate the output so as to compensate the variations in the energy input.

15 Claims, 19 Drawing Figures

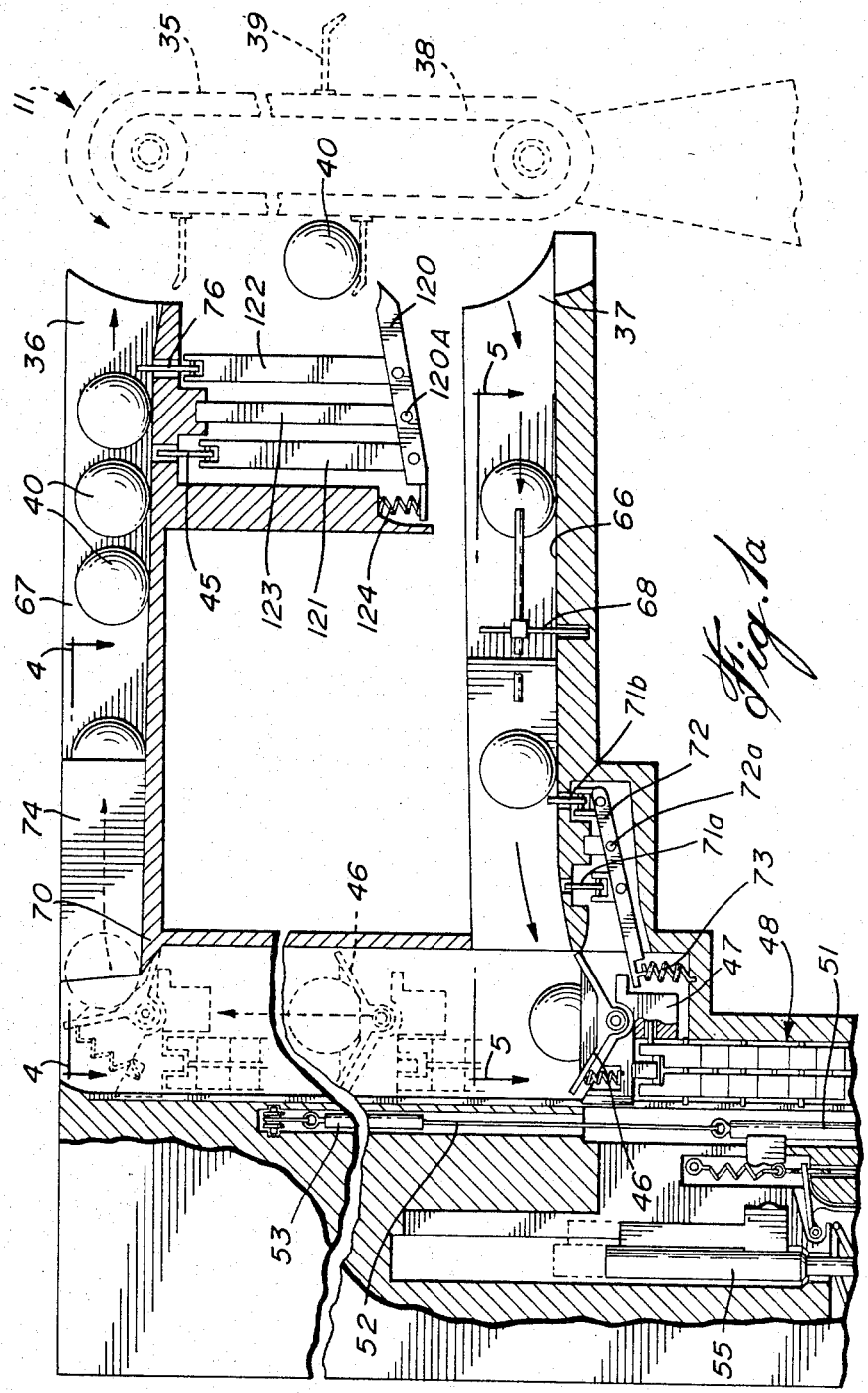

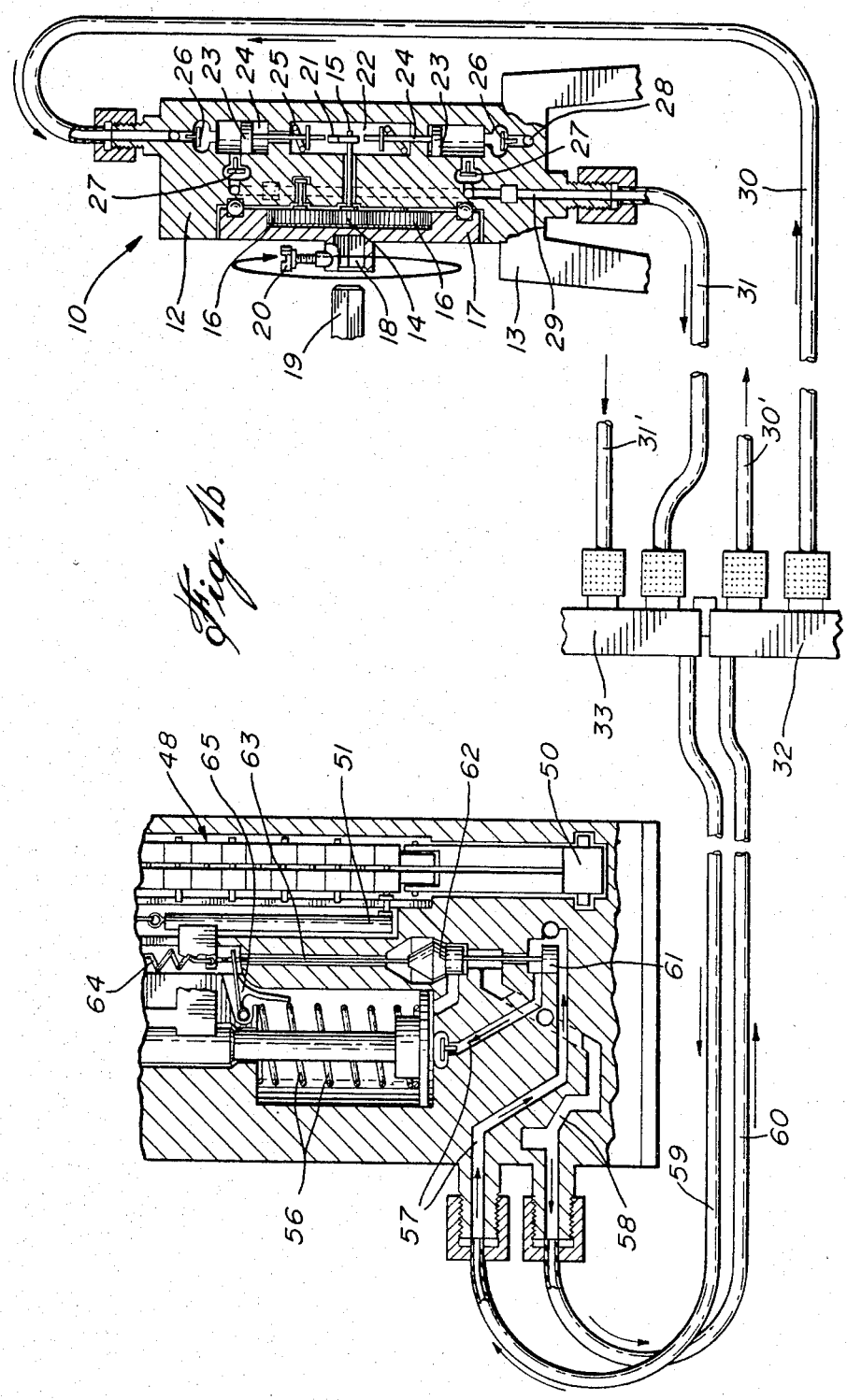

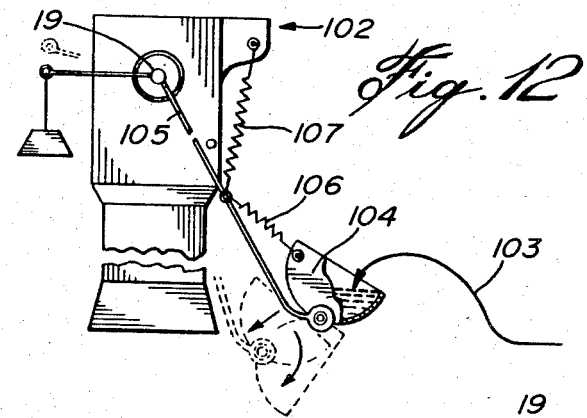
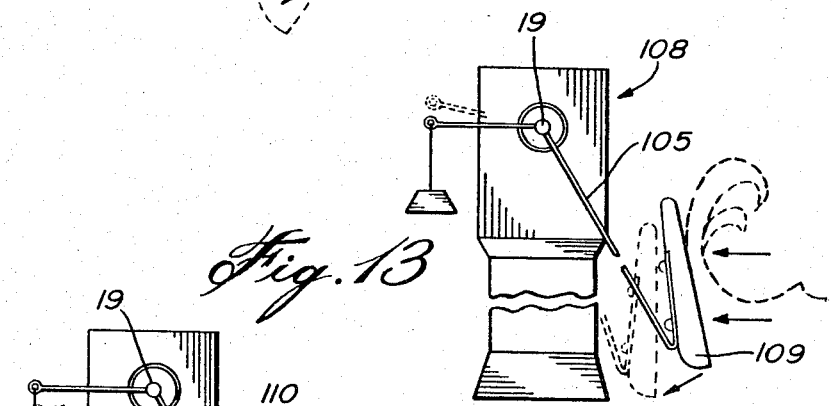
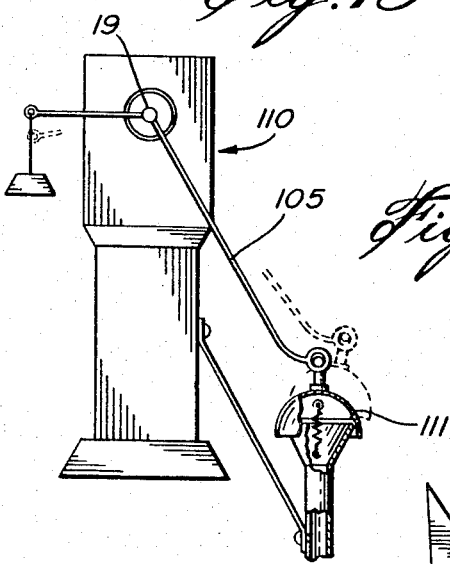
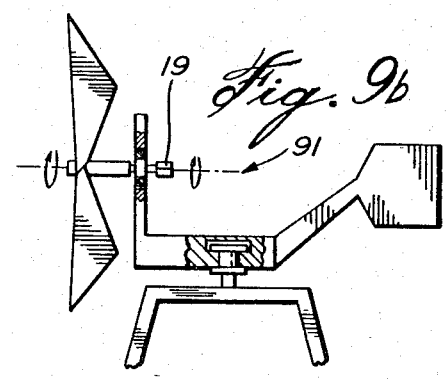

POTENTIAL ENERGY ACCUMULATING SYSTEM USING MULTIPLE TYPES OF ENERGY INPUT

This is a continuation-in-part of U.S. patent application Ser. No. 422,887 made by the present applicant and filed Sept. 24, 1982, now abandoned.

FIELD OF THE INVENTION

This invention relates to a system to accumulate potential energy and, in particular, to such a system of the type adapted to harness multiple sources of energy including those of variable input, such as from the wind, the sun or the water.

DESCRIPTION OF THE PRIOR ART

The competitive production of power from the wind, the sun and also in many cases also from the water, is hampered in particular by the large seasonal, daily and even hourly variations in the amount of such energy that is available at any time.

OBJECTS OF THE INVENTION

It is a general object of the present invention to provide a system of the above type, which is constructed and arranged to reduce the effect of the variable input of such sources of renewable energy.

It is another object of the present invention to provide a system of the above type, which may be driven by about any kind or number of energy-responsive machines.

It is a more specific object of the present invention to provide a system of the above type, in which potential energy is accumulated during the peak portions to be released during the energy deficient portions of the cycles of operation.

Still another object of the invention is to provide a system of the above type, in which variable rotary input power is converted into substantially constant output.

It is a further object of the present invention to provide a system of the above type, which is of simple, inexpensive and efficient construction and operation and which can be each assembled and disassembled for intallation at various locations.

BRIEF DESCRIPTION OF THE DRAWINGS

The above and other objects and advantages of the present invention will be better understood with reference to the following detailed description of a preferred embodiment thereof, which is illustrated, by way of example, in the accompanying drawings, in which:

FIG. 1a is a cross-sectional view of a major portion of a potential energy accumulating plant forming part of a first embodiment of the present invention, showing a rotor assembly in dotted lines;

FIG. 1b is a cross-sectional view of a pumping unit in combination with the remainder of the plant thus complementarily illustrating, in cooperation with FIG. 1a, a potential energy accumulating system with variable input-regulated output according to the present invention;

FIG. 4 is a cross-sectional view of dual weight passages at the upper end of the weight lifting assembly, as seen along line 4—4 in FIG. 1a;

FIG. 5 is a cross-sectional view of a dual weight passage and gate at the lower end of the weight lifting assembly, as seen along line 5—5 in FIG. 1a;

FIGS. 9, 9a, and 9b are schematic illustrations of three different types of turbines that are usable in cooperation with the pumping unit of FIGS. 1b and 7, and that would provide variable drive to it;

FIGS. 12 to 16 inclusive are schematic elevation views of water-actuated units that can also be used to drive the pumping unit of FIGS. 1b and 7.

DESCRIPTION OF THE PREFERRED EMBODIMENT

Figure 7:
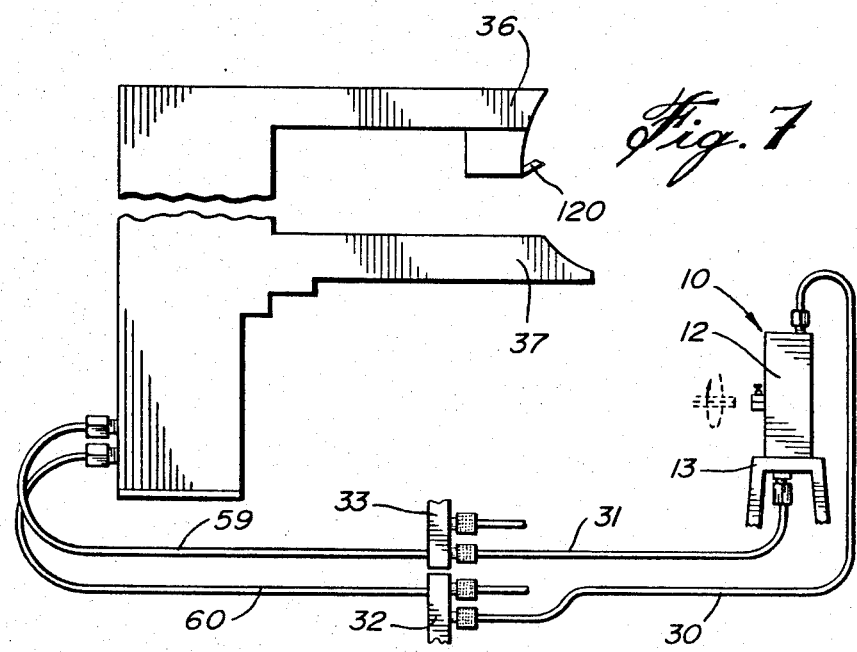
FIG. 7 is an outline and schematic view of the plant illustrated in details by FIGS. 1a and 1b.

The illustrated system (see FIG. 7, 1a and 1b) comprises pumping unit 10, a drive unit to actuate the pumping unit and a potential energy accumulating plant 11 that is connected to the pumping unit to be hydraulically or pneumatically operated by the latter.

The pumping unit 10 comprises a body 12 carried by legs 13. A planetary gear system is mounted into one face of the body 12 and includes a sun gear 14 fixedly attached on an axle 15, planet gears 16, and a ring gear member 17. The latter is rotatably mounted by ball bearings, as shown, in a circular cavity in one side of the body 12. The ring gear member 17 is provided with a socket 18 axially projecting outward thereof and arranged to be driven by a stud axle 19 of a driving element. That stud axle is secured in the socket 18 by a setscrew 20. Thus, any rotation of the stud axle 19 is transmitted to the ring gear member 17 and to the sun gear 14 and axle 15. A cam 21 is mounted on the end of the axle 15 in a central chamber 22.

A pair of pistons 23 are slidably mounted in a pair of radial piston chambers positioned radially outward relative to the central chamber 22. There is a series of pairs of pistions 23 and chambers equally angularly arranged in a circle. Each piston 23 is provided with a piston rod 24 having its head projecting in the central chamber to be engaged by the cam 21. The latter is arranged to alternatively engage the heads of the pistons 23 and to outwardly displace the same alternatively radially outwardly in its piston chamber against the bias of the corresponding return spring 25. Each piston chamber is provided with an inlet and an outlet apertures and check valves 26, 27 mounted in them respectively. The inlet apertures are interconnected by an outlet passage 29. The inlet passage 28 and the outlet passage 29 are connected by fluid lines or tubes 30 and 31 to an inlet manifold 32 and an outlet manifold 33, respectively. Those manifolds 32 and 33 allow to connect two or more pumping units in parallel one with the other to supplement each other. For instance, a second pumping unit, not shown, would be connected by fluid lines 30' and 31' to the corresponding manifolds 32 and 33. For instance, two or more pumping units 10 could be actuated by two different driving elements, such as a wind turbine for one and a solar energy apparatus for the other, as shown hereinafter.

The plant 11 is operated by the fluid pressure produced by one or more pumping units 10. The plant 11 can be used to drive, for instance, a rotor assembly 35 to operate, for example, an electric generator.

The rotor assembly 35 includes an endless conveyor that extends downwardly from the outlet end 36 of an upper ramp or trough 67 to a lower inlet end 37 of a lower return ramp or trough 66. The endless conveyor includes an endless belt 38 to which are secured shelves or plates 39. The latter are arranged to carry weights in the form of balls 40 that are dropped on them on one side of the endless conveyor to rotate the latter. Appropriate means transmit the rotation of the endless conveyor to any load, such as an electric generator. Rotor assembly 35 can be eliminated, and balls 40 allowed to drop freely, or otherwise to do useful work, such as stone crushing.

The weight lifting circuit comprises a weight lifting assembly formed of a pair of weight or ball lifting mechanisms mounted side by side and operated by a common actuation system.

Figure 4:
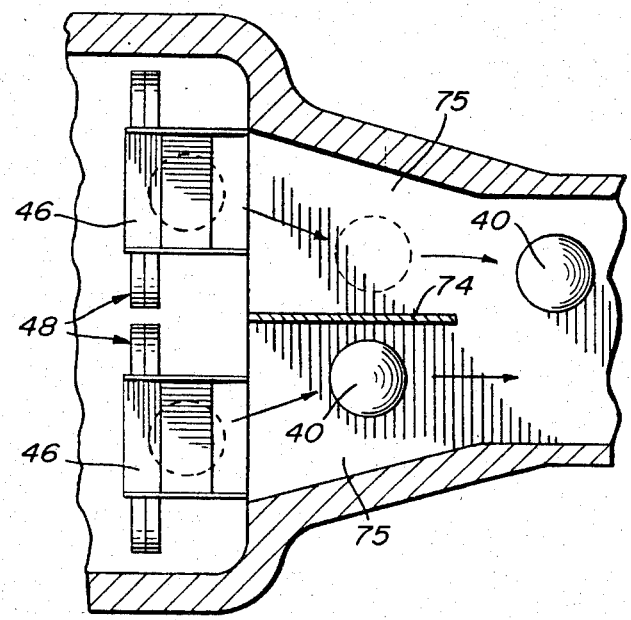
Figure 5:
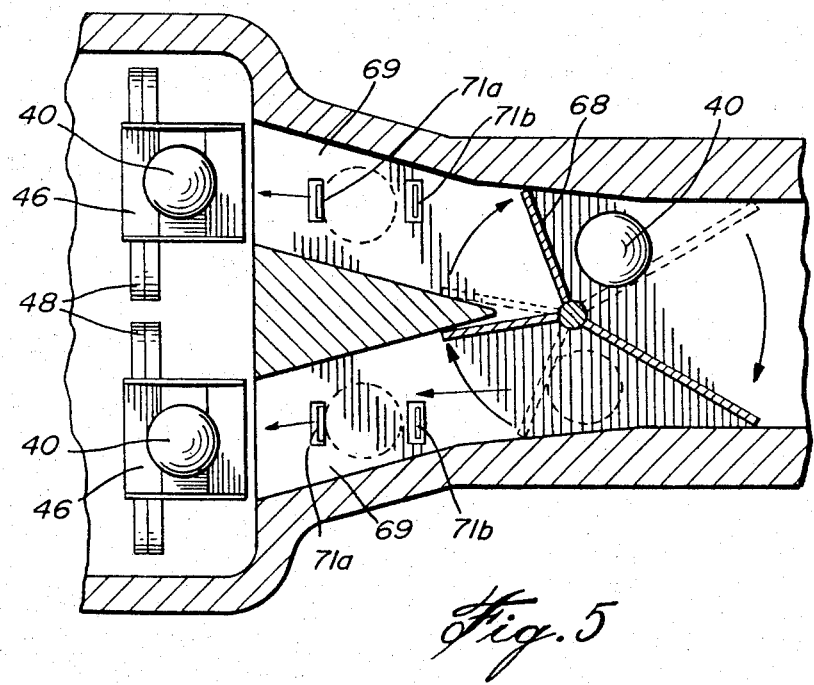

As shown in FIGS. 1a, 4, and 5, the weight lifting assembly defines a lower entry and an upper exit for the balls 40. Each ball lifting mechanism includes a receptacle 46 that is pivotally connected to a bracket 47 and a scissor link unit 48. The latter includes a plurality of scissor links 49 that are articulated one to another. The lower end 50 of each scissor link unit 48 is secured in fixed position relative to the housing of the plant. The upper end of each scissor link unit 48 carries the bracket 47 to displace the latter and the receptacle 46 up and down with it. An actuator member 51 is connected to the lower scissor link 49 to upwardly expand the same and to expand the upper end of the scissor link unit at a greater distance compared to the lower scissor link. The actuator member 51 is attached at one end of a cable 52 at the other end of which a counterweight 53 is attached. The cable 52 passes over a pulley such that the counterweight 53 balances the weight of the actuator member 51 and the corresponding scissor link unit, bracket 47 and receptacle 46.

Figures 2, 3:
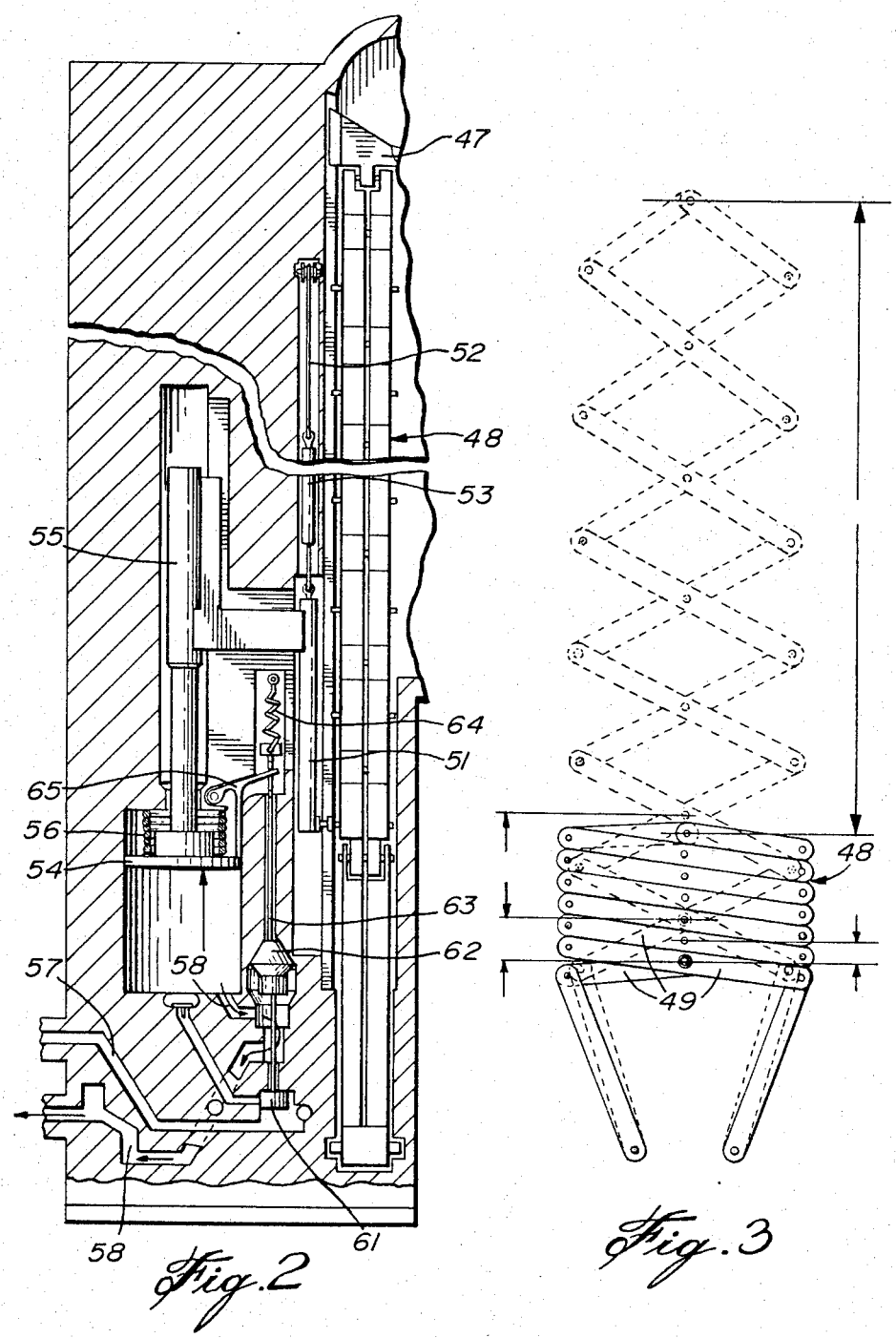
FIG. 2 is a view of a weight lifting assembly forming part of FIGS. 1a and 1b, in combination, and illustrating the weight lifted position.
FIG. 3 is a side elevation view of a scissor link forming part of the weight lifting assembly.

A common actuation system for the two weight lifting mechanisms is operatively connected to the corresponding actuator members 51. The common actuation system includes a pair of cylinders with each a piston 54 slidable in it. Each piston 54 is provided with an axial projection 55 that is fixedly attached to the corresponding actuator member 51 to bodily displace the latter with its piston. Each piston 54 is downwardly biased by a return spring 56 to expel the fluid from its cylinder. A fluid inlet passage 57 and a fluid outlet passage 58 are formed in the plant 11 under the pistons 54, are connected to the manifolds 32 and 33 by tubes 59 and 60 respectively, and communicate with each cylinder. The pair of fluid inlet passages 57 of the two cylinders are interconnected one with the other, and so are the two outlet passages 58. A double valve is provided for each cylinder to selectively close either one or the other of the corresponding inlet passage 57 or outlet passage 58. For that purpose, each of the two double valves is provided with a valve element 61 and a valve element 62, respectively. Each double valve includes a stem 63 that upwardly projects and is downwardly biased by a return compression spring 64. An arm 65 is pivoted above each piston 54 and arranged to upwardly displace the corresponding double valve upon engagement by the corresponding piston when the latter arrives at its innermost or topmost position, as shown in FIG. 2. When this occurs, the valve element 61 stops the supply of fluid into the cylinder through the inlet passage 57 and opens the outlet passage 58 to expel the fluid from the cylinder under the action of the corresponding return spring 56. It can thus be seen that, when one piston 54 moves upward, the other moves downward and the fluid that is expelled from one cylinder compensates or balances the fluid that is pumped into the other cylinder; and the fluid lines and elements can thus form a substantially closed system.

As can be seen in FIG. 3, the small displacement or extension of the lower scissor link 49 is converted into a much larger displacement of the upper end of the scissor link unit and, thus, of the corresponding receptacle 46 that lifts a ball 49 to the exit end of the ball lifting mechanism from the lower entry.

The weight lifting circuit includes the lower trough 66 and the upper trough 67. The loweer trough 66 forms a ramp downwardly sloping from the outlet of the endless conveyor 35 to the lower entry of the ball lifting mechanisms. The upper trough 67 slopes in the opposite direction from the upper exit of the ball lifting mechanisms to the upper outlet end 36.

A swing gate 68 (FIGS. 1a and 5) is pivoted at the entry of the ball lifting mechanisms and is Y-shaped in cross-section to operatively pivot transversely between the dual inlet passages 69. The swing gate 68 is pivoted from one side to the other by each ball 40 that rolls by. This is done by the ball engaging one of its sides and pivoting it, so that the next ball will engage the other side, and so on alternatively. Thus, the ball lifting mechanisms will alternatively be loaded and will lift a ball to unload it at the upper exit by tilting of the receptacles 46 upon abutment with the projection 70 at the upper end of each ball lifting mechanism.

The loading of a ball on each receptacle 46 is controlled by a first and second spaced-apart flap gate 71a, 71b pivotally connected to a transverse bar 72 extending under trough 66. Bar 72 is also pivotally connected to the ramp at 72a intermediate gates 71a, 71b.

The first gate 71a is nearer to receptacles 46 than the second gate 71b. The bar 72 also includes at the end thereof, adjacent bracket 47, a coiled spring 73 fixedly connected thereto and downwardly extending. Spring 73 biases gate 71a upwardly through the wall of ramp 66, while biasing retraction of gate 71b under the lever action.

Before a ball 40 is loaded in receptacle 46, the downwardly moving bracket 47 presses the end of bar 72 against spring 73. Thus, gate 71a retracts, and gate 71b protrudes upwardly, preventing other balls 40 from falling in the latter receptacle 46.

When receptacle 46 is lifted, it allows another ball 40 to engage in a position in beteen gates 71a and 71b, since ramp 66 is inclined, and since the bias of spring 73 will retract gate 71b and extend gate 71a, through the ramp 66 and thereinto.

Everything is done automatically, simply by the weight of balls 40, and the displacement of receptacle 46.

The upper exit (FIGS. 1a and 4) is divided by a partition 74 into dual exit passages 75 registering with the two ball lifting mechanisms, respectively.

As best seen in FIG. 1a, spaced-apart pivoted regulating gates 45 and 76 are positioned at the upper inlet end of the endless conveyor 35, and are arranged to intercept the balls 40 and hold them in the ramp 67 and, thus, to form a waiting station for them.

The operating mechanism of gates 45, 76 is quite similar to that of gates 71a, 71b. Gates 45, 76 are pivotally connected to a transverse bar 120, through corresponding arms 121, 122. Bar 120 is itself pivotally connected to ramp 67 through arm 123, located between arms 121, 122. A coil spring 124 also biases gate 76 to protrude within ramp 67, while it biases gate 45 to become retracted.

When a shelf 39 becomes in registry with bar 120, it will temporarily abut the free end thereof, wherein the bar will pivot on its central axis 120a against the bias of spring 124. This will extend gate 45 and retract gate 76. When the shelf 39 releases bar 120, the latter pivots to its initial position, and gate 45 retracts and gate 76 is extended.

The balls 40 thus timely roll down to fall onto the shelves 39. If no rotor 35 is used, then the falling balls may be used for othr types of work. the ramp 67 may be arranged to store any desired number of balls 40 to hold a good reserve at the waiting station. However, by using multiple types of power inputs, the number of balls 40 stored at the waiting station can be reduced.

Thus, the generation of power may be sustained despite interruption of the pump and lifting mechanism for lack of sufficient wind, sunshine, and/or fluid energy to operate the machine driving the stud axle 19.

Figure 6:
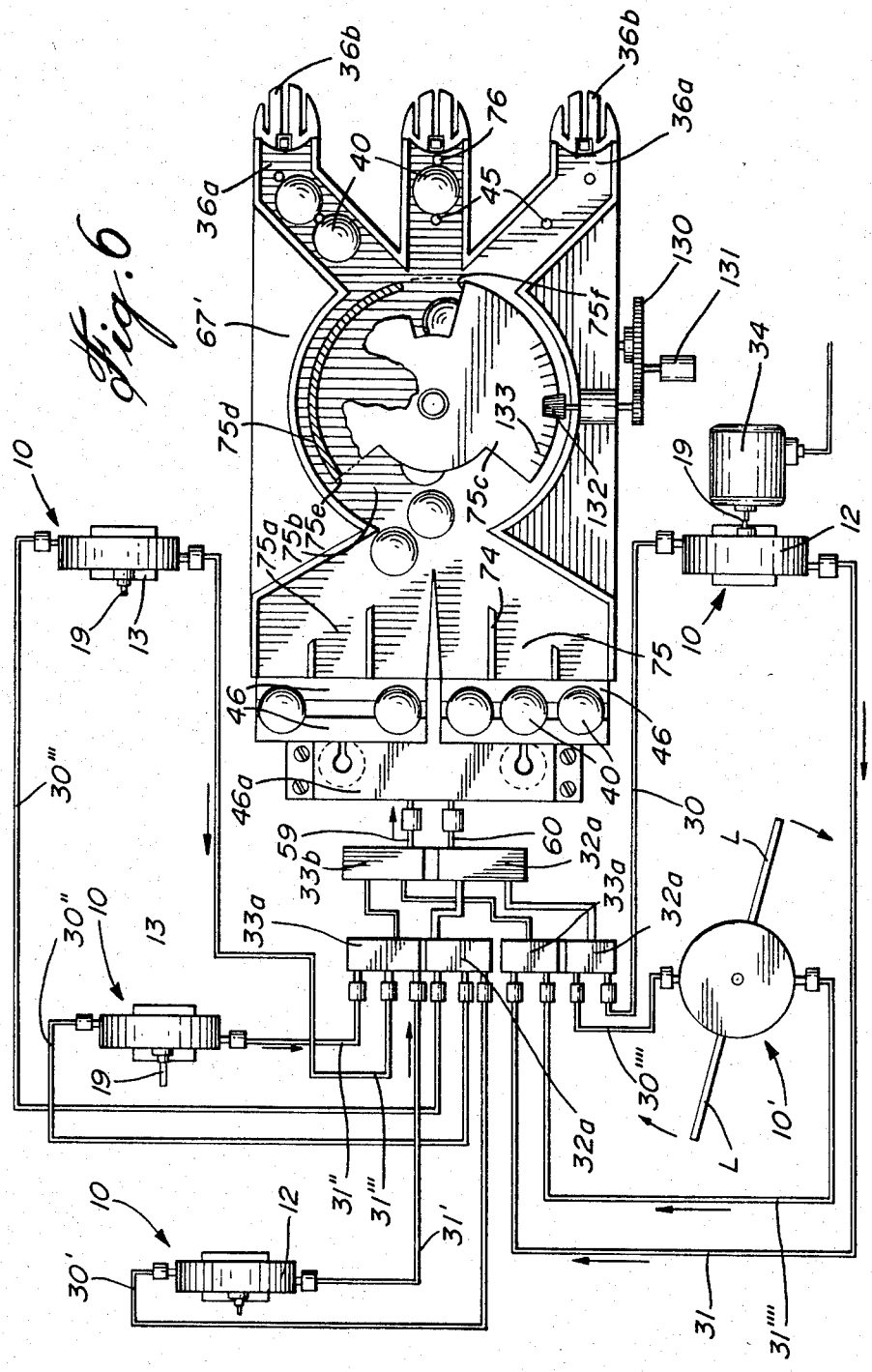
FIG. 6 is a top plan view of the potential energy accumulating plant according to a second embodiment of the invention.

FIG. 6 specifically discloses a potential energy accumulating system having a plurality of pumping units 10 and weight lifting mechanisms located in casing 46a and each including long buckets 46 each lifting, for instance, three balls 40. Each pumping unit may be driven by a different power source. One of these units, at 10', may be activated by large animals drawing the legs L of the unit when the animals are guided to walk around the unit 10'. One unit 10 may be driven by electric motor 34 fed by a conventional electric power grid during periods of low demand. Any number of units 10 may be provided with fluid feed and return lines 30 to 30'''', 31 to 31''''to feed manifolds 33a, 33b and return manifolds 32a and 32b.

The essential difference found in the embodiment of FIG. 6 is the shape of the upper ramp 67, now a multi-ramp 67', including a rear-enlarged portion 75a, an intermediate circular portion 75b, and a number of front legs 36a. Within circular portion 75b of ramp 67 there is axially connected thereto a distributor disc 75c, having a depending circular skirt 75d extending toward portion 75b. Skirt 75d forms a wide inlet 75e always communicating with portion 75a for constantly receiving balls 40, and a narrow outlet 75f for the passage of successive balls 40. Disc 75c may be rotated by a crank wheel 130, operated by a handle 131, and actuating a bevel gear 132 meshing with radial teeth 133 on disc 75c.

Rotation of disc 75c aligns outlet 75f with any selected leg 36a to allow selective distribution of balls 40 into legs 36a. Each leg 36a may be associated with a rotor assembly having fingers instead of shelves 39 to pass between fingers 36b at the outlet of legs 36a.

Figure 8:
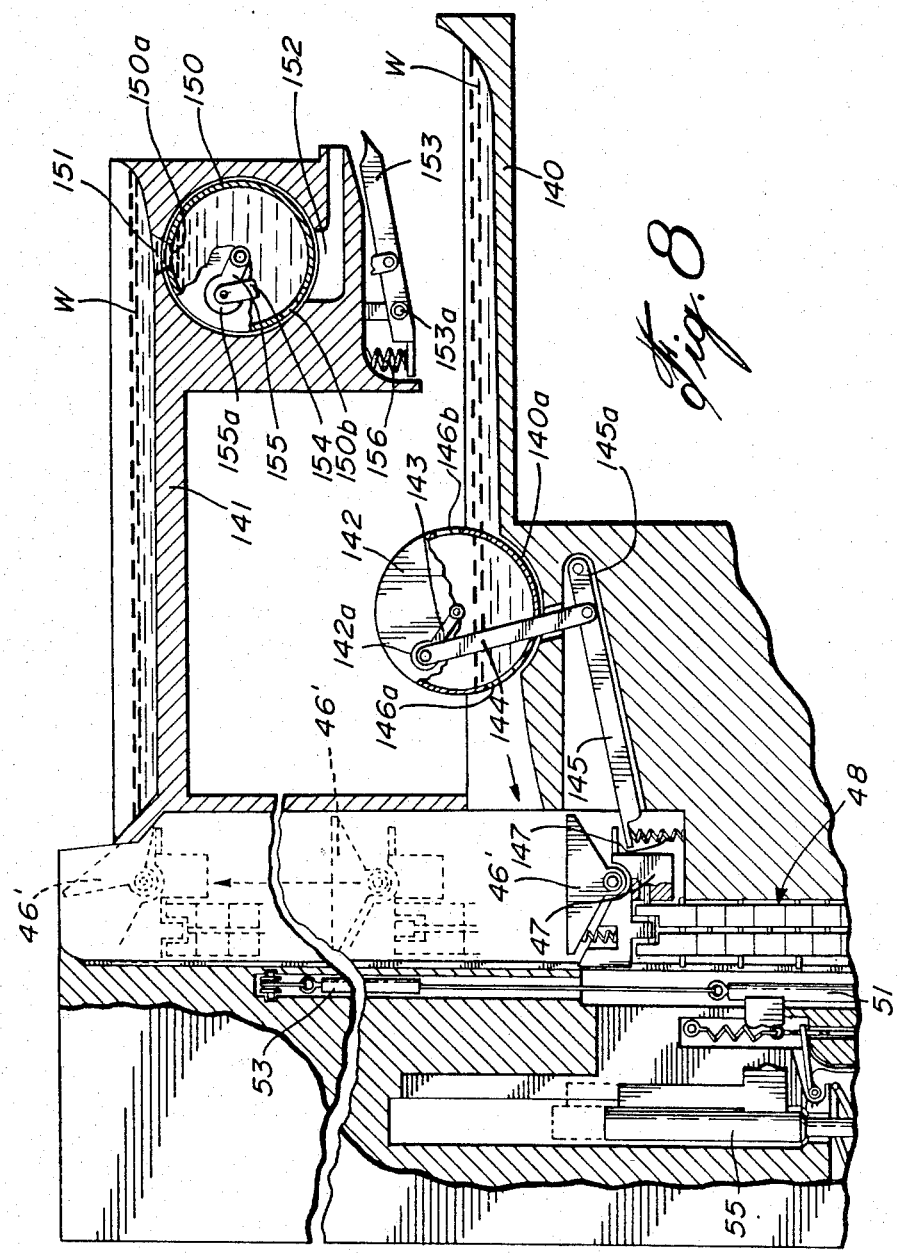
FIG. 8 is a cross-sectional view of a plant forming part of another embodiment of the invention.

In the embodiment of FIG. 8, the solid balls 40 are replaced by a liquid. The troughs are in the form of basins 140, 141 capable of containing a liquid, such as water W thereinto, and being at the bottom and top portion respectively of the system. The receptacles of the weight-lifting mechanism are replaced here by water-tight water buckets 46', activated in the same manner as before. However, release of determined amount of water W from lower basin 140 into a bucket 46' is done through prior engagement of water within a cylindrical valve 142 pivotable about its central axis.

The valve 142 rotatively engages a recess 140a of basis 140 and is pivotable through a link 144 eccentrically pivoted to valve 142 at 142a and pivoted at its other end to a transverse lever 145 located under basin 140.

Lever 145 is similar to bar 72 in its relation with bracket 47, and has an inner end 145a pivoted to the frame. Valve 142 includes two wall openings 146a, 146b opposite one to the other. When a water bucket 46', seated on its bracket 47, is lowered during its cycle, bracket 47 pivots arm 145 downwardly against the bias of the spring 147. This draws link 144 therewith, and rotates valve 142 counterclockwise. The water trapped within valve 142 may exit through outlet opening 146a, toward bucket 46', while inlet opening 146b is now over the water-line.

Basin 141 also includes a cylindrical valve 150 housed within the walls thereof and under the body of water W of the same. Valve 150 is sealingly rotatable and also includes two peripheral top and bottom openings 150a, 150b. Opening 150a may become in registry with a basin drain hole 151 and opening 150b may become in registry with a lowermost outlet duct 152, but not at the same time.

Rotation of valve 150 is operated by the movement of shelves 39 (see FIG. 1a) (now water-holding buckets) that each temporarily abut on a lever 153 to downwardly pivot the same about pivot axis 153a. Lowering lever 153 draws down link 154 pivotally connected at 155a to the wall of valve 150. The bias of spring 156 returns bar 153 to its initial position. As shown in FIG. 8, lowering link 154 rotates valve 150 counterclockwise.

Since the volume of water W transferred to each bucket 46' is less than half the capacity of valve 142, whereas the volume of water escaping through outlet duct 152 is equal to the inner volume of valve 150, one needs larger buckets for collecting the water of upper basin 141 than the buckets 46' collecting the water from basin 140. However, the arrangement of valve 150 could be similar to that of lower valve 142.

As may now be seen from FIGS. 9 to 16 inclusive, a good variety of machines operated by renewable energy and characterized by a variable output may be connected to drive the pumping unit 10. It must be noted that any number of such machines may be connected to any number of pumping units 10 to produce a fluid flow through the manifolds 32, 33 to the aforedescribed weight lifting mechanisms.

Figure 9A:
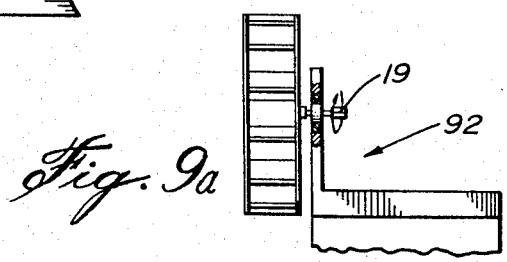
Figure 9:
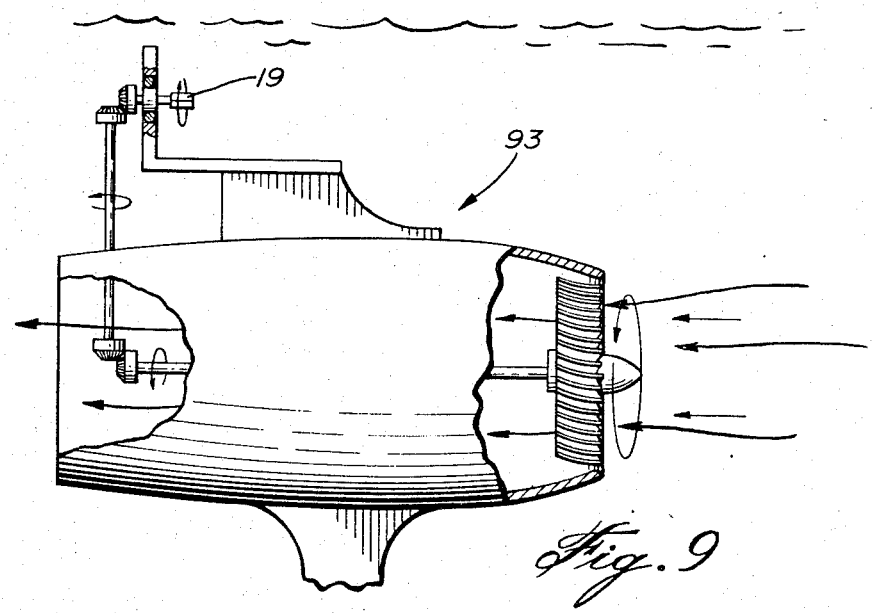

FIGS. 9, 9a, 9b respectively illustrate three types of horizontal axis rotatable turbines; a wind propeller 91, a wind paddle wheel 92, and a water turbine blade 93 wherein the horizontal output axle is to be drivingly connected to the stud axle 19 of FIG. 1b.

Figure 11:
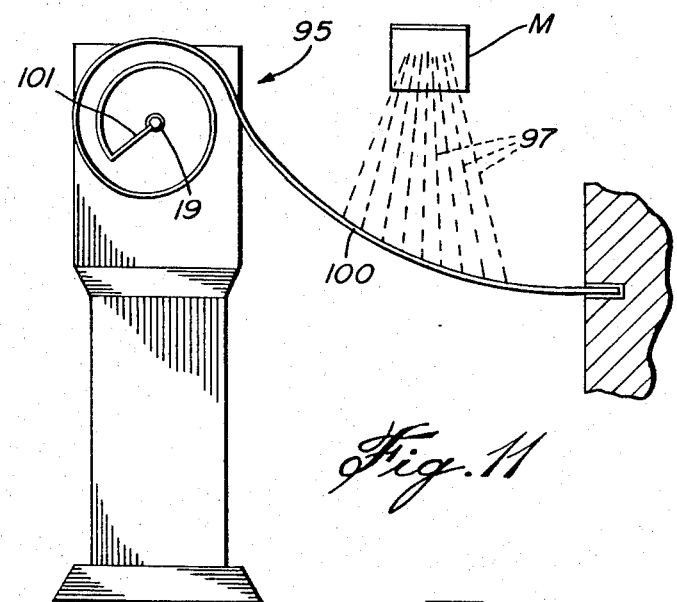
FIGS. 10 and 11 are schematic elevations of two different types of solar energy units that can be used to provide the variable drive to the pumping unit.
Figure 10:
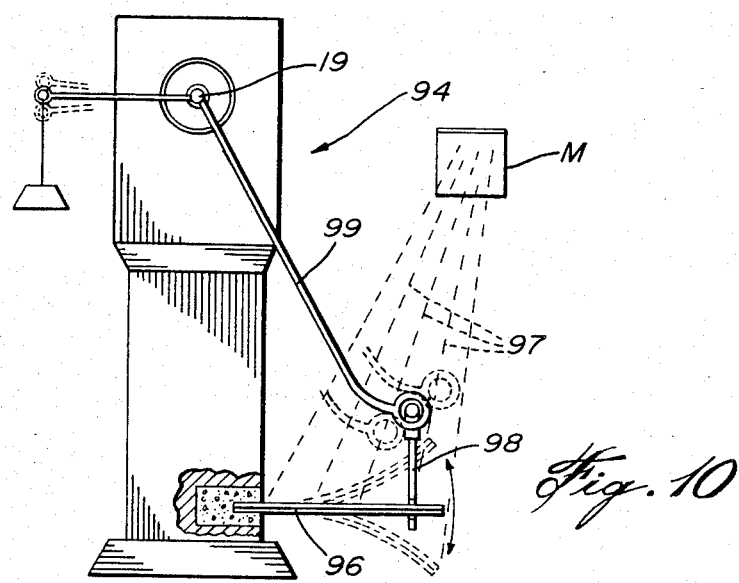

FIG. 10 and 11 illustrate two types of solar energy actuated machines 94 and 95, whose output shaft is connected to the stud axle 19. The machine 94 includes a bi-metal blade 96 whose displacement in response to the sun rays 97 reflected by, for example, a mirror M, is transmitted to the stud axle 19 by a rod 98 and an arm 99. The machine 95 includes a bi-metal coil 100 whose reaction to the sun rays 97 reflected by mirrow M, is converted into rotation of its coiled portion and, thus, of the stud axle 19 to which it is attached by an arm 101.

FIG. 12 illustrates a machine 102 that is operated by waves 103 of a body of liquid. The latter fills a bucket 104 that is pivotally mounted on an arm 105. The bucket 104 is upwardly biased by springs 106, 107, and the arm 105 is connected to the stud axle 19.

As can be seen, the liquid fills the bucket 104 and rotates the stud axle 19. Bucket 104 then empties for successive cycles. The stud axle 19 thus rotates back and forth, producing pumping by the unit 10 due to the planetary gear system in the pumping unit.

In the machine 110 of FIG. 14, intermittent undergound spurts of liquid or gas move the bell-shape cap 111 up and down to reciprocally rotate the stud axle 19.

Figure 15:
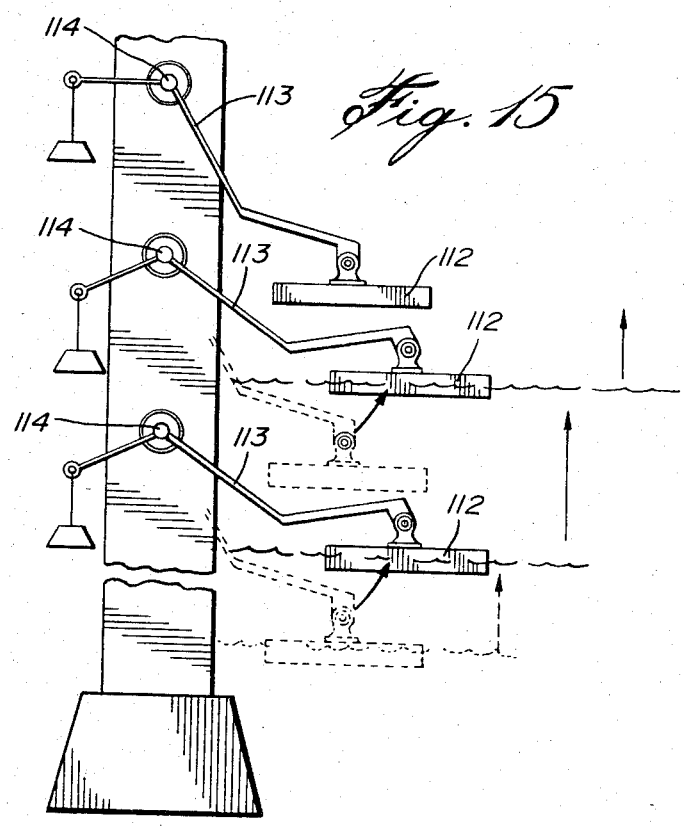

In FIG. 15, a plurality of floating pads 112 are connected by arms 113 to rotate the axles 114 in accordance with the tide.

Figure 16:
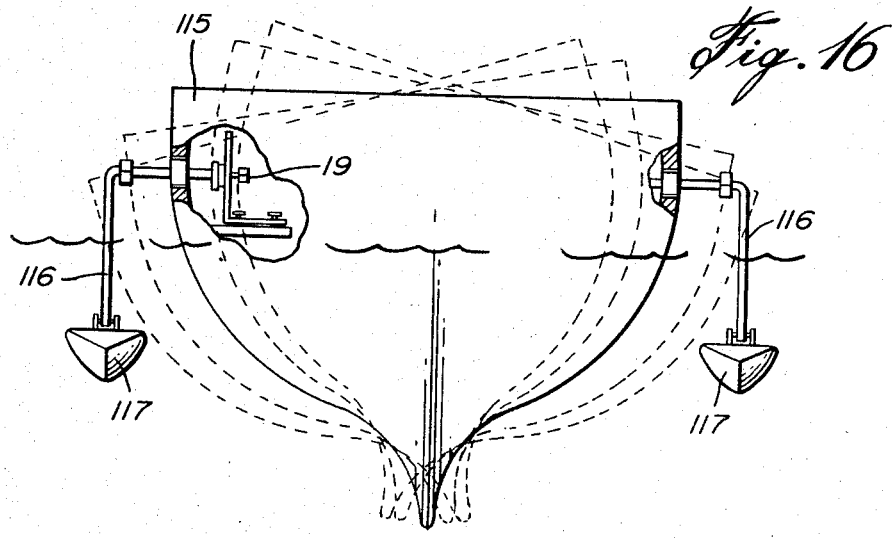

In FIG. 16, the stud axles 19 are rotated by rocking of a boat 115. This is done through the relatively pivotal displacement of the arms 116 attached to the floats 117 and to the stud axle 19.

From the above description, it is clear that the system of the present invention can use several different energy sources to actuate the pumping units 10 or 10′. Therefore, these sources may be such that the peak of their respective power output will occur at different times, to therefore enable to store a minimum of balls 40 or a minimum volume of water at the waiting station in the upper trough. Therefore, such a waiting station need not be of very large capacity so much so that non-variable energy sources can also be used to drive the pumping units in case of failure to obtain power from the variable energy sources.

The system of the invention can be made of separable parts adapted to be easily taken apart and reassembled at another location. The lower trough system could be located in an undergound gallery of an abandoned mine with the upper trough on the ground and with the weight lifting mechanism in one shaft and the outlet and inlet ends of the upper and lower troughs in register with another mine shaft. The system can be situated so as to take advantage of the topography of the soil. Also, the scissor link units can be positioned upside down with the actuating piston 54 at the upper end and the receptacle 46, or water bucket 46′, at its lower end.

I claim:

1. In a potential energy accumulating system, a weight lifting means operatively defined and extending from a lower entry to an upper exit and capable of successively conveying discrete weights from the entry to the exit, power input means driving said weight lifting means, upper and lower trough means communicating with said exit and entry respectively and each having an inlet and an outlet, said upper trough means having storage means for containing a multiple amount of such weights, the outlet of said upper trough means adapted to discharge discrete weights from an upper level, means to return said discrete weights back to the inlet of said lower trough means and a weight regulator positioned at the outlet of the upper trough means to time regulate the falling of the weights off said last-named outlet.

2. In a system as defined in claim 1, wherein said weights are balls and the weight regulator includes a pair of spaced-apart gates individually intercepting said balls and means for opening and closing said gates in alternate manner.

3. In a system as defined in claim 2, wherein the weight lifting means include a pair of weight lifting mechanisms positioned side by side, and a common actuation system connected to both weight lifting mechanisms and alternatively actuating the same, and each of the lower trough outlet and the upper trough inlet includes dual passages operatively registering with the pair of weight lifting mechanisms respectively.

4. In a system as defined in claim 3, wherein the lower trough outlet includes a swing gate operatively pivoted between the corresponding dual passages to alternatively deviate a weight into the other of the corresponding passages in response to the passage of a weight in one of the corresponding passages.

5. In a system as defined in claim 1, wherein said weight lifting means includes a scissor link unit having scissor links extendable and retractable from a fixed end, a receptacle attached to the opposite end of the corresponding scissor link unit and bodily displaceable up and down therewith between the lower entry and the upper exit.

6. In a system as defined in claim 5, wherein the receptacle is tiltably secured to the opposite end of the corresponding scissor link unit and said weight lifting means include a tripping projection at the upper end thereof constructed and arranged to tilt the upcoming receptacle upon engagement therewith and unloading of the weight therefrom through the upper exit.

7. In a system as defined in claim 6, wherein the weight lifting means include an actuation member connected to a scissor link at the fixed end of the corresponding scissor link unit to produce larger linear displacement of the opposite end of the corresponding scissor link unit relative to said scissor link at the fixed end of the corresponding scissor link unit.

8. In a system as defined in claim 3, wherein the common actuation system includes a pair of cylinders and a pair of pistons, the latter being operatively connected to and actuating the weight lifting mechanisms respectively, fluid lines interconnecting the cylinders, and valves operated by the pistons and constructed and arranged to concurrently actuate the pistons back and forth alternatively relative one to the other.

9. In a system as defined in claim 8, wherein said fluid lines include a pair of fluid inlet passages communicating with said cylinders respectively and interconnected one with the other, and a pair of fluid outlet passages communicating with said cylinders respectively and interconnected one with the other, said valves include a double valve for each cylinder constructed and arranged to selectively close either of the fluid inlet and the fluid outlet passages of the corresponding cylinder, a control arm is connected to each double valve and constructed and arranged to actuate the latter and place the corresponding cylinder in open communication with the corresponding fluid outlet passages upon arrival of the corresponding piston at the corresponding predetermined innermost position, and return springs operatively engage each piston and double valve and operatively bias the same toward a starting position of fluid flow into the corresponding cylinder.

10. A system as defined in claim 8, further comprising at least one fluid pumping unit connected to the fluid actuation system to supply actuating fluid thereto and each including a rotatable input member constructed and arranged to actuate the corresponding fluid pumping unit, and a driving machine drivingly coupling to the rotatable input member of each fluid pumping unit.

11. In a system as defined in claim 1, wherein said weights are bodies of water; said weight lifting means including water-tight water buckets, for containing said bodies of water during operation of the weight lifting means; said lower and upper trough means consisting of a bottom basin for containing water before transfer into said buckets, and a top basin, for receiving water from within said buckets, respectively.

12. In a system as defined in claim 11, wherein the weight regulator comprises a first rotary cylindrical valve mounted in a casing and having peripheral first and second openings; said top basin including a drain outlet; said first opening registering with said drain outlet in a first rotated position of said first valve, said second opening then being closed, and said second opening communicating with a discharge aperture of said casing for the falling of water contained in said first valve in a second rotated position when said first opening is then being closed.

13. In a system as defined in claim 12, wherein the weight lifting means includes a second rotary valve, similar to said first rotary valve, and rotatively supported in a casing formed in the outlet portion of said bottom basin; said second valve having a first and a second peripheral opening; said second valve first opening into said bottom basin in a first-rotated position, said second valve second opening then being closed, and said second valve second opening over said buckets in a second rotated position, said second valve first opening then being closed.

14. In a system as defined in claim 13 and including a rotor assembly, wherein said first valve is rotatable through first lever means by said rotor assembly, the latter including a plurality of spaced-apart water-tight buckets which, by striking said first lever means during operation of the rotor assembly, activates rotation of said first valve from said first to said second rotated position thereof, and further including return resislient means biasing said first valve to said first-rotated position.

15. In a system as defined in claim 14, wherein said second valve is rotatable through second lever means by said buckets of said weight lifting means, said last-named buckets which, by striking said second lever means during operation of the weight lifting means activate rotation of said second valve from said first to said second rotated position thereof, and further including additional return resilient means biasing said second valve to said first position.

* * * * *